United States Patent
Kochura et al.

(10) Patent No.: US 10,049,108 B2
(45) Date of Patent: Aug. 14, 2018

(54) IDENTIFICATION AND TRANSLATION OF IDIOMS

(71) Applicant: International Business Machines Corporation, Armonk, NY (US)

(72) Inventors: Nadiya Kochura, Bolton, MA (US); Alphonse J. Wojtas, East Hampstead, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/373,640

(22) Filed: Dec. 9, 2016

(65) Prior Publication Data

US 2018/0165275 A1   Jun. 14, 2018

(51) Int. Cl.
*G06F 17/28* (2006.01)
*G06F 17/27* (2006.01)

(52) U.S. Cl.
CPC ........ *G06F 17/289* (2013.01); *G06F 17/2705* (2013.01); *G06F 17/275* (2013.01); *G06F 17/2785* (2013.01)

(58) Field of Classification Search
CPC .............. G06F 17/289; G06F 17/2705; G06F 17/2765; G06F 17/30976; G06F 3/0481; G06F 17/2795; G06N 99/005; G06N 5/02; G06N 7/005
See application file for complete search history.

(56) References Cited

U.S. PATENT DOCUMENTS

| | | | |
|---|---|---|---|
| 5,644,774 A * | 7/1997 | Fukumochi | G06F 17/2775 704/2 |
| 9,164,983 B2 | 10/2015 | Liu et al. | |
| 2003/0083862 A1* | 5/2003 | Hu | G06F 17/2755 704/9 |
| 2008/0077385 A1* | 3/2008 | Yamanaka | G06F 17/2836 704/10 |
| 2008/0091634 A1* | 4/2008 | Seeman | G06N 5/022 706/59 |
| 2009/0144052 A1 | 6/2009 | Lee et al. | |

(Continued)

FOREIGN PATENT DOCUMENTS

| | | |
|---|---|---|
| JP | 20033030194 | 10/2003 |
| WO | 2010151437 | 12/2010 |

OTHER PUBLICATIONS

Sattikar, A. A., and R. V. Kulkarni. "Natural language processing for content analysis in social networking." International Journal of Engineering Inventions 1.4 (2012): 06-09.*

(Continued)

*Primary Examiner* — Brian L Albertalli
(74) *Attorney, Agent, or Firm* — Lieberman & Brandsdorfer, LLC

(57) ABSTRACT

Identification and translation of idioms is performed with respect to electronic communications. Confusion with an expression is determined. Based on the confusion an idiom within the expression and an explanation of the idiom is identified. The idiom and corresponding explanation are extracted from the electronic communication. The language of the idiom is identified and the idiom is translated to a second language. The idiom, corresponding explanation, translation, and/or corresponding metadata are stored in a corpus that supports a search of the idiom.

20 Claims, 9 Drawing Sheets

(56) References Cited

U.S. PATENT DOCUMENTS

| | | | |
|---|---|---|---|
| 2010/0114887 A1 | 5/2010 | Conway et al. | |
| 2010/0235723 A1* | 9/2010 | Nakajima | G06F 17/2735 715/205 |
| 2013/0095460 A1* | 4/2013 | Bishop | G09B 21/009 434/308 |
| 2014/0272821 A1* | 9/2014 | Pitschel | G09B 19/06 434/157 |
| 2015/0254230 A1 | 9/2015 | Papadopoullos et al. | |
| 2015/0331849 A1 | 11/2015 | Porat | |
| 2016/0004687 A1 | 1/2016 | Kurian et al. | |

OTHER PUBLICATIONS

Li, Linlin, and Caroline Sporleder. "Classifier combination for contextual idiom detection without labelled data." Proceedings of the 2009 Conference on Empirical Methods in Natural Language Processing: vol. 1-vol. 1. Association for Computational Linguistics, 2009.*

Fazly, Afsaneh, and Suzanne Stevenson. "Automatically Constructing a Lexicon of Verb Phrase Idiomatic Combinations." EACL. 2006.*

Muzny, Grace, and Luke Zettlemoyer. "Automatic Idiom Identification in Wiktionary." Proceedings of the 2013 Conference on Empirical Methods in Natural Language Processing. 2013.*

Fazly, Afsaneh, Paul Cook, and Suzanne Stevenson. "Unsupervised type and token identification of idiomatic expressions." Computational Linguistics 35.1 (2009): 61-103.*

Sattikar et al., Natural Language Processing for Content Analysis in Social Networking, International Journal of Engineering Inventions, vol. 1, Issue 4, Sep. 2012, pp. 6-9.

Anonymous, A Method for Constructing a Context Specific Conversational Dictionary, An IP.com Prior Art Database Technical Disclosure, IPCOM000241896D, Jun. 5, 2015, pp. 1-4.

Carlson, Parsing Spoken Dialogue, A Man of Measure, Festschrift in Honour of Fred Karlsson, on his 60th birthday (2006), pp. 128-137.

Boye et al., Robust Parsing and Spoken Negotiative Dialogue with Databases, Natural Language Engineering 1, 1998 Cambridge University Press, received Apr. 12, 2006, pp. 1-24.

List of IBM Patents or Applications Treated as Related, Dec. 2016.

* cited by examiner

IDENTIFICATION AND TRANSLATION OF IDIOMS

BACKGROUND

The present embodiments relate to identification and processing of idioms in a natural language processing environment. More specifically, the embodiments relate to monitoring electronic communications and utilizing machine learning to identify idioms and explanations of the idioms in order to develop a continuously expanding phrase dictionary for language translation.

In the field of artificially intelligent computer systems, natural language systems (such as the IBM Watson™ artificially intelligent computer system or and other natural language question answering systems) process natural language based on knowledge acquired by the system. To process colloquial language, which is often full of idioms, the system often performs a literal translation. The resulting outcome can be incorrect or inaccurate for a variety of reasons relating to peculiarities of language constructs and/or cultural differences.

Current language translation algorithms fall short of properly translating language idioms, such as expressions peculiar to a given language, regional speech or dialect, specialized vocabulary understood by a specific group of people, or jargon. Language idioms are particularly pervasive in the realm of social media due to the informal nature of such communication. Particularly, text messages sent through social media devices usually contain short-hand phrases, jargon, and expressions peculiar to the language or even the geographical area. To complicate matters even further, text messages are free form and typing mistakes are prevalent causing inaccurate translation(s).

SUMMARY

The embodiments include a system, computer program product, and method for identification and translation of idioms and explanations of idioms.

In one aspect, a system is provided with a processing unit in communication with a memory, and an artificial intelligence platform in communication with the processing unit. The artificial intelligence platform has an analyzer and a translator to dynamically evaluate an electronic communication. The analyzer determines confusion with an expression in an electronic communication and identifies an idiom within the expression. Based on correspondence to the state of confusion, the analyzer identifies an explanation of the idiom. The translator identifies the language of the electronic communication including the language of the idiom. The translator translates the idiom to a second language idiom and creates a second language expression utilizing the second language idiom. The analyzer updates the corpus with the second language idiom, including transforming the second language idiom into an updated entry in the corpus.

In another aspect, a computer program product is provided to dynamically evaluate an electronic communication. The computer program product includes a computer readable storage medium with embodied program code that is configured to be executed by a processing unit. More specifically, program code determines confusion with an expression in an electronic communication and identifies an idiom within the expression. Based on correspondence to the state of confusion, program code identifies an explanation of the idiom. Program code identifies the language of the electronic communication including the language of the idiom and translates the idiom to a second language idiom. Program code creates a second language expression utilizing the second language idiom. Program code updates the corpus with the second language idiom, including transforming the second language idiom into an updated entry in the corpus.

In yet another aspect, a method is provided for dynamic evaluation of an electronic communication. Confusion with an expression in an electronic communication is determined and an idiom within the expression is identified. Based on correspondence to the state of confusion, an explanation of the idiom is identified. The language of the electronic communication is identified including the language of the idiom. The idiom is translated to a second language idiom and a second language expression is created utilizing the second language idiom. The corpus is updated with the second language idiom, including transforming the second language idiom into an updated entry in the corpus.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

With the growth of portable communication devices and social media applications and associated venues, the nature of conversation is both social and in many respects informal. Segments of the population refer to such written informal communications as spoken word. These communications commonly include or refer to emotions, neologisms, falsehoods, rumors, etc. In addition, these communications are generally free form, with typing errors and chat slang present. Accordingly, the analyzer and knowledge base described herein analyze language specific idioms in a source language and dynamically translate the idioms within the same language, in case of slang, or to a target language.

Figure 1:
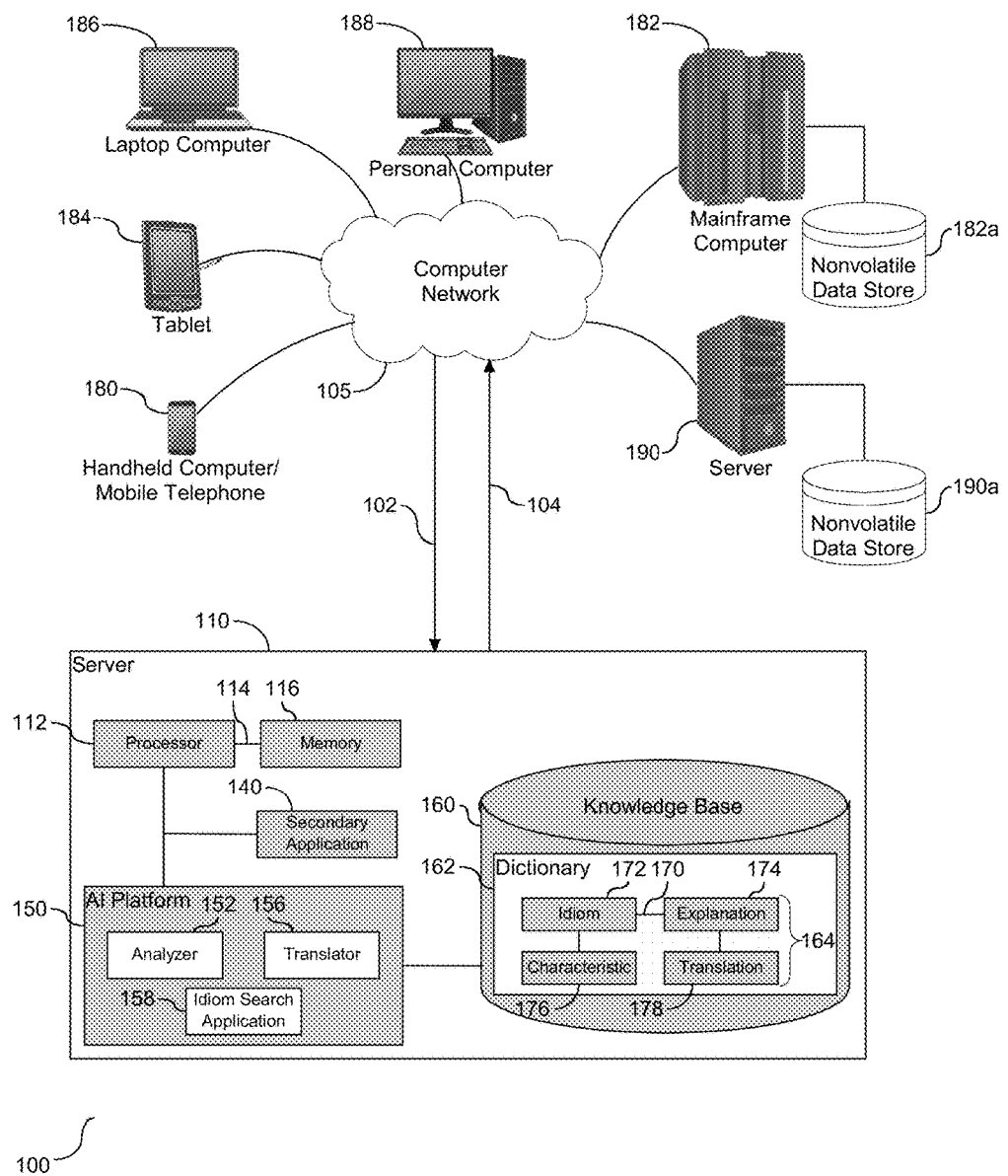
FIG. 1 depicts a block diagram illustrating a natural language process system and tools to support assessment and translation of an idiom.

Referring to FIG. 1, a block diagram (100) is shown with a natural language process system and tools to support assessment and translation of an idiom. As shown, a server (110) is provided in communication with a computer network (105). The computer network may include several devices such as handheld computers mobile phones (180), tablets (184), laptop computers (186), and personal computers (188). The system may also include larger scale devices such as mainframe computers (182) with separate nonvolatile data storage (182a) or servers (190) with separate nonvolatile data storage (190a). Within the server (110), a processing unit (112) is shown in communication with memory (116) across a bus (114). An artificial intelligence (AI) platform (150) is shown embedded in the server (110) and in communication with the processing unit (112). In one embodiment, the AI platform (150) may be local to memory (116). The AI platform (150) provides support for identification, detection and analysis of one or more idioms and idiomatic phrases, hereinafter referred to collectively as idiom, in an electronic communication(s). As shown, the AI platform (150) includes tools which may be, but are not limited to, an expression analyzer (152), hereinafter referred to as an analyzer, a translator (156), and an idiom search application (158). Each of these tools functions separately or combined in the AI platform (150) to dynamically evaluate one or more expressions.

As shown, a knowledge base (160) is provided in communication with the server (110). The knowledge base (160) functions as a corpus, and in one embodiment, may be comprised of multiple corpi including but not limited to as individual idiom corpus for separate languages, individual corpus for idioms of different subject categories, or individual corpus for translations and/or meanings of idioms. Alternatively, the knowledge base (160) may function as a single corpus. The knowledge base (160) may also include a conversational phrase dictionary (162) which may be expanded by means of the embodiments disclosed and supported herein. The dictionary (162) is shown local to the knowledge base (160), although in one embodiment, the dictionary (162) may be accessible to the server (110) across a network (105). For example, in one embodiment, the dictionary (162) may be stored on shared data storage across the network (105), such as a cloud shared resource.

The tools (152)-(158) that comprise the AI platform (150) employ aspects of the knowledge base (160) and/or the dictionary (162). As shown herein, the server (110) is programmed to obtain input data (102) from devices in the network (105), such as written forms of communication. The AI platform (150) functions as an interface between received input data (102) containing electronic communication(s) and the knowledge base (160). Analysis conducted by the AI platform (150) may generate output, as discussed in detail below, which may be conveyed as response data (104) across the network (105). Accordingly, the AI platform (150) is programmed to communicate output data (104) created by the AI platform (150) with support from the knowledge base (160) to one or more corresponding devices through the network (105).

It is understood that one or more devices in the network may participate in one or more electronic communications. For example, one or more electronic communications may be transmitted between device (180) and device (188) across the network (105). The AI platform (150) dynamically evaluates the communication(s) to identify one or more expressions present in the communication(s). In one embodiment, an expression is string data in the communication corresponding to a phrase or particular expression of thought. In one embodiment, the dynamic evaluation takes place in real-time while the communications are being sent and received between two or more devices across the network (105). Accordingly, the AI platform (150) evaluates communication(s) to determine expressions present in the communication(s).

The analyzer (152) functions to identify and resolve idioms in the communication(s) and/or expressions. In one embodiment, the analyzer (152) may reside in an inactive state, and a state change effectively activates the analyzer (152) in response to or in association with a detection of a communication(s). The analyzer (152) examines communications containing expressions and determines presence of an idiom in an expression. The analyzer (152) consults with the knowledge base (160), and in one embodiment, the associated dictionary (162), to conduct a primary evaluation of a potential idiom. More specifically, the analyzer (152) identifies a direct correspondence and relationship between an idiom in the knowledge base (160) and an expression within an electronic communication containing a possible idiom. The identified correspondence supports a confidence level assignment. Accordingly, the initial evaluation includes identifying a relationship between the electronic communication and the knowledge base in order to support a confidence level assignment.

As described herein, the analyzer (152) assigns a confidence level to the detected idiom, with the confidence level reflecting presence of the idiom within the evaluated communication(s). The level of confidence varies according to the similarity of the potential idiom with one or more idioms in a corpus, such as the knowledge base (160), and entries in the knowledge base (160) to which the idiom is or has been compared. For example, the analyzer (152) compares the potential idiom in the communication(s) with an idiom and/or other expression in a corpus, such as the knowledge base (160), and finds an idiom and/or expression that features a similar grammatical structure and/or meaning based on the comparison. In one embodiment, the confidence level is a scaled value reflecting an initial evaluation. For example, the scaled value in the form of a first confidence level assignment may serve as an indicator of the probability that the expression necessarily contains an idiom (e.g. the potential idiom within the expression is an idiom), or the scaled value in the form of a second confidence level assignment may serve as an indicator of uncertainty that the expression contains an idiom. In one embodiment, the level of confidence may be a binary value, e.g. first and second, or a gradual value, e.g. 1 to 10 where 1 is the lowest level of confidence and 10 is the highest level of confidence. Accordingly, a value is assigned to the confidence level associated with the detected potential idiom, the value having a direct correlation to similarity between the idiom and an idiom in the knowledge base (160).

As articulated above, the confidence level may be divergent, high versus low, or in one embodiment may be based on a scale with multiple levels of which at least one level reflects confidence of a match and at least one other level reflect minimal confidence of the match. A first confidence level assignment is followed by the analyzer (152) identifying an explanation of the idiom in the communication, extracting the idiom and the corresponding explanation, and updating the knowledge base (160) with the idiom and corresponding explanation. The explanation of the idiom provides a meaning of the detected idiom, or in one embodiment attempts to explain, the meaning of the idiom. More specifically, a primary association (170) between the idiom (172) and the explanation (174) is created and stored in the knowledge base (160) as an entry (164). Accordingly, an idiom assigned with a first confidence level and the corresponding explanation is extracted from the electronic communication and stored in the knowledge base (160).

A second confidence level assignment may be followed by the analyzer (152) activating a secondary application (140) to facilitate an integrity check of the idiom in the electronic communication and the corresponding explanation of the idiom. The secondary application (140) is shown local to the server (110), although the secondary application (140) may be located in an external server and in communication with server (110) across a network connection (105). The secondary application (140) functions in communication with the analyzer (152) and creates a message containing a communication, e.g. an alert, including the expression containing the potential idiom and the assigned confidence level. In one embodiment, the message includes the explanation of a potential idiom contained in the expression. The message may then be transmitted to an external system or entity, or in one embodiment any computing entity in communication with the network (105), for manual review of the identified idiom and its context within the communication(s). The secondary application (140) conveys the explanation and the idiom together with the second confidence level assignment in order to determine a secondary association, and facilitate or otherwise enable a selective update of the knowledge base based on the secondary association (160).

The knowledge base (160) is shown with dictionary (162) to store and correlate identified idioms, corresponding explanations and/or associated translations. In one embodiment, the dictionary (162) is dynamic. As the analyzer (150) creates new associations related to detected idioms, new entries are created and added to the dictionary (162) with the new entries including a relationship between the detected idiom and the corresponding explanation. In one embodiment, the explanation is a translation of the idiom. Accordingly, the analyzer (150) functions as an interface between the knowledge base (160) and associated dictionary (162) and one or more devices in communication with the server (110) across a network connection (105).

As described herein, the expression containing a potential idiom in the electronic communication is subject to a multi-facetted evaluation, and as such requires an encompassing evaluation to return an accurate explanation of the idiom. In one embodiment, each entry in the dictionary (162) may have characteristic metadata (176) associated with an entry containing an idiom (172) and a corresponding explanation of the idiom (174). In one embodiment, the analyzer (152) evaluates an origin of the idiom, determines one or more characteristic of the origin, and employs the one or more characteristics to determine an explanation to the idiom. The origin evaluation takes into consideration one or more characteristics associated with the communication being evaluated, including dialect, region, accent, demography, and/or age group. These characteristics may be considered individually or collectively. In one embodiment, the evaluation of the origin includes extraction of metadata associated with the origin. Accordingly, characteristics of the idiom may be used to enhance the accuracy of the returned explanation of a potential idiom.

Similar to the origin evaluation, the analyzer (152) uses emotion metadata when determining a matching entry in a corpus, such as knowledge base (160). In one embodiment, emotion may be associated with each entry in the dictionary (162) as characteristic metadata. In one embodiment, the expression containing a potential idiom that is subject to evaluation is a written form of communication, and aspects of emotion may be present and detectable within text or indicia of the communication. The analyzer (152) evaluates the expression containing the potential idiom to ascertain any associated emotion, so that the emotion may be employed as a characteristic of the explanation. Examples of emotion that may be detected include, but are not limited to, a question, surprise, emotion, and/or an emoticon embedded in the communication. For example, a happy face emoticon is generally related with a feeling of pleasure, whereas a said face emoticon is generally related with a feeling of displeasure. Either of these detected feelings may be employed by the analyzer (152) in the assignment of the explanation of the idiom, state of confusion and/or the idiom. In one embodiment, emotion is detected from an expression within an electronic communication containing audio data. In one embodiment, the emotion may be detected based on emphasis of a particular syllable, pitch, tone, etc. Accordingly, characteristic metadata (176) associated with the communication comes in different forms and is employed in the expression evaluation.

Beyond the surface of the origin and perhaps presence of an emoticon, the analyzer (152) goes beyond the surface of the communication to ascertain an explanation of the expressed idiom. More specifically, the analyzer (152) parses the expression so that elements within the communication may be identified. In one embodiment, the analyzer (152) isolates at least two components within the communication. A structure associated with each of the components is identified. In one embodiment, each entry in the knowledge base (160) includes characteristic metadata (176), including, but not limited to structural characteristics of the communication components. When searching the knowledge base (160) for a known or previously stored explanation for the idiom, the analyzer (152) compares the identified components of the communication with the metadata of stored idioms in the knowledge base (160). If a match is found between at least one of the components and characteristic metadata (176) of a stored idiom, a match between the idiom being evaluated and an explanation in the knowledge base (160) is returned. Accordingly, the analyzer (152) evaluates the expression in its entirety to identify a structure of the communication as a characteristic for identification of the idiom explanation.

The translator (156) is provided as a tool in the AI platform (150). The translator (156) communicates with the analyzer (152). It is understood that the electronic communication subject to evaluation is expressed in a language and includes an associated dialect, both of which may affect the evaluation of the expression and idiom. The translator (156) functions to identify the language and/or dialect of the communication, and more specifically, based on this identification the translator (156) identifies an explanation present within the communication(s). The explanation serves as a translation (178) of the idiom and may be stored with entry (164) for the idiom (172) in the dictionary (162). In one embodiment, the explanation (174) and the translation (178) are the same. Based on the identification, the knowledge base (160) receives an update in the form of a created entry with the identified idiom and the translation. In one embodiment, characteristic metadata (176) of the expression is extracted by the analyzer (152) and attached to the created entry (164) to facilitate future expression evaluation(s). Accordingly, the translator (156) functions as a tool to support multiple languages and dialects, and in one embodiment cultural contributions to the expression.

The translator (156) functions to identify the language and dialect, and in one embodiment the functionality extends to a translation of the idiom across languages. More specifically, the translator (156) may identify the presentation of the idiom in the expression, and based on the analysis, translate the idiom to a second language. For example, in an electronic communication between two entities, such as a communication between mobile phone (180) and tablet (184), two or more languages may be embedded therein with one or more idioms present. An idiom in one language may not have a direct translation to the second language. Rather, the translator (156) works with the analyzer (152) to identify the languages, the expression containing the idiom within the communication, and based on these factors, and in one embodiment additional factors, produces a translation of the idiom from the originating language to the second language, with the translation taking into account the entirety of the expression within the electronic communication. In one embodiment, the translator (156) picks a translation (178) associated with an entry (164) in the dictionary (162) based on identification of one or more languages in the communication. Accordingly, the translator (156) accounts for translation across dialects and languages, with the translation accounting for the expression associated with the idiom.

It is understood that electronic communications may be conveyed across visual displays. Specifically, the communication is understood to involve at least two entities, with each entity having an associated visual display to present the communication. For example, personal computer (188) may be operatively coupled to a first visual display to visually exhibit the communication being transmitted, and mobile telephone (180) may be operatively coupled to a second visual display to visually present the received communication. A mouse, pointer, or in the case of a display with a capacitive sensor, a gesture, may be utilized to interface with the visual display. It is similarly understood that indicia, sometimes in the form of a cursor, is utilized to identify a position with respect to the visual display and the active communication. The indicia may be employed to actively or passively convey identification of the idiom. For example, in one embodiment, the indicia may be placed proximal to the communication, expression, or the idiom within the communication, with the placement detected by the analyzer (152). More specifically, detection of movement of the cursor proximal to the communication, expression, or the idiom within the communication activates an idiom search application (158), hereinafter referred to as the IS application. In one embodiment, the IS application (158) remains in the background in a low operating state until such time as the position of the cursor activates or changes the state of the IS application (158) to an active state.

The IS application (158) functions in conjunction with the tools (152)-(156) to resolve any issues with respect to identifying and resolving any idiom that might be present in the communication(s). As shown herein, when the application enters the active state, the application evaluates the communication to search and identify any idioms that may be present. In one embodiment, it is understood that the communication is an active communication present in an open window or viewing space on the visual display. Based on the idiom identification, or in one embodiment a possibility of presence of an idiom in the communication, the knowledge base (160) is searched and consulted for the idiom to facilitate ascertaining an explanation of the idiom and/or translation of the meaning and connotation of the use of the idiom within the context of the communication. It is understood that the idiom is either present or absent from the knowledge base (160). If use of the idiom is identified in the knowledge base (160), e.g. an entry for the idiom is found, followed by the use of the idiom being returned and presented on the visual display. Similarly, if the use of the idiom is not found in the knowledge base (160), the analyzer (152) and translator (156), analyze the use of the idiom as described above, and return a translation of the idiom with respect to the expression within the communication. The returned idiom translation is presented on the visual display.

It is understood that the conveyance of the idiom translation should not interfere with the active communication(s). The communication(s) and the returned translation are presented in separate windows of the visual display, with the communication presented on a primary window and the returned idiom translation presented on a secondary window. In one embodiment, the presentation of the cursor proximal to the expression causes the IS application (158) to create the secondary window, which in one embodiment is positioned proximal to the primary window so that the windows are not-overlapping to avoid interference. Similarly, at such time as the cursor or equivalent identifier is moved away from the primary window, the IS application (158) closes the secondary window. Accordingly, the IS application (158) evaluates a position on the cursor or equivalent indicia in relation to the communication in the primary window, and selectively controls creation and removal of the secondary window, as well as population of data in the secondary window.

Figure 2:
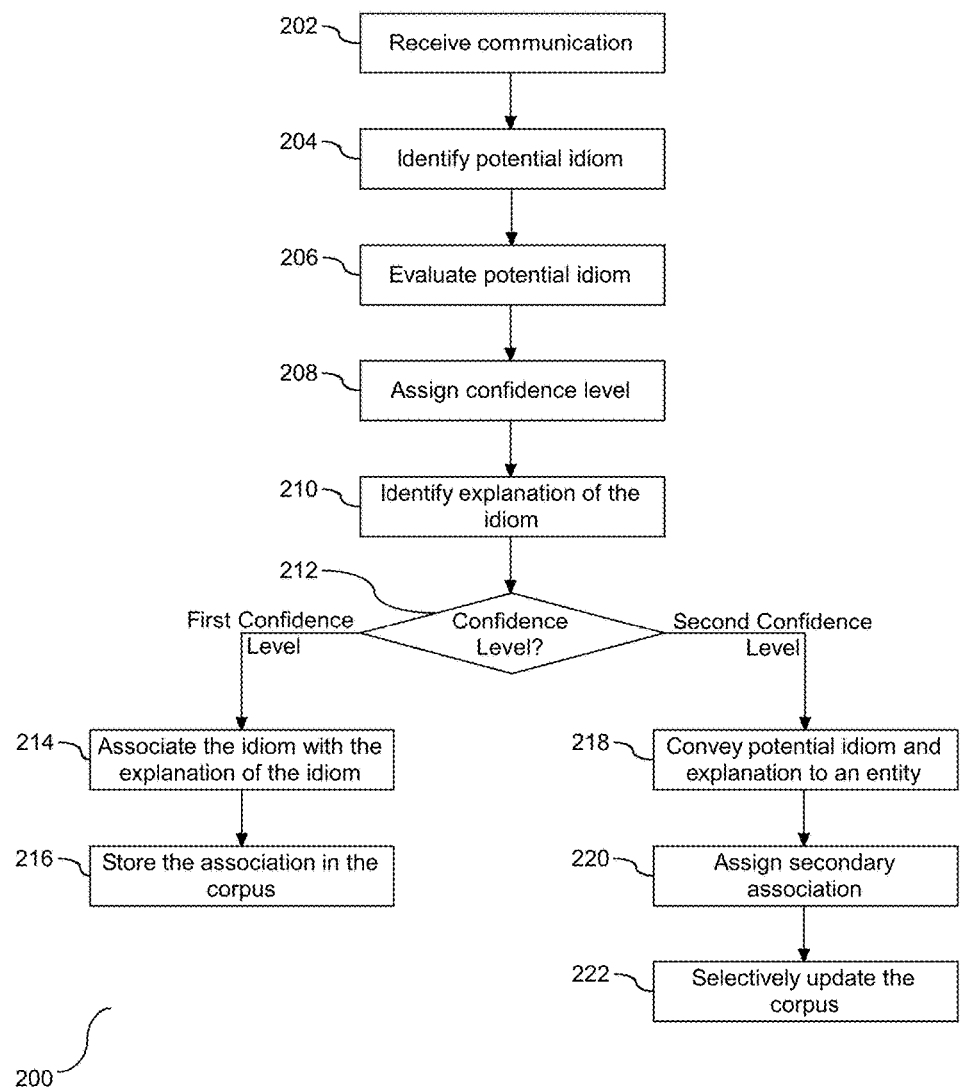
FIG. 2 depicts a flowchart illustrating a process for identification of an idiom and an associated explanation and creation of an associated entry in a corpus having a conversation phrase dictionary.

Referring to FIG. 2, a flow chart (200) illustrating a process for identification of an idiom and an associated explanation, and creation of an associated entry in a corpus with a conversation phrase dictionary. As shown, an electronic communication is received (202). The electronic communication is examined to identify potential idioms (204). A potential idiom may be identified by determination of confusion with an expression and/or by comparison to a corpus of learned knowledge. It is understood that an idiom may be less than a whole expression, equal to a whole expression, comprise multiple expressions, and/or parts of multiple expressions. In one embodiment, identifying the idiom by comparison to a corpus of learned knowledge includes parsing expression(s) within communication(s) and isolating components that comprise the expression(s) containing idiom, comparing a grammatical structure of the isolated components to a structure of stored idioms in a corpus of learned knowledge and detecting a match between the isolated components and a stored idiom in the corpus of learned knowledge. In one embodiment, identifying the idiom by confusion with an expression includes determining a state of confusion with an expression. The state of confusion with an expression is an indicator or flag that a potential idiom is present in the expression and a corresponding explanation is present in the same or different expression in the electronic communication. The determination of confusion with an expression includes determining confusion indicators which may be in the form of, but is not limited to, a question, surprise, emotion, emoticon, and/or one or more rules in a corpus of learned knowledge. Accordingly, potential idioms are identified by identification of confusion and utilization of a corpus of learned knowledge.

The potential idiom is evaluated (206). The evaluation includes comparing the potential idiom to a structure of stored idioms in a corpus of learned knowledge and possible matches for the idiom including similarities and differences. In one embodiment, the evaluation includes extraction of metadata association with the origin of the idiom and utilizing the metadata when comparing the idiom to the corpus. Based on the evaluation, a confidence level is assigned to the potential idiom (208). More specifically, the confidence level reflects the clarity with which the system has detected the potential idiom; the confidence level is directly related to the similarity of the potential idiom with idioms already in the corpus of learned knowledge and in one embodiment, a conversational phrase dictionary. In one embodiment, the confidence level value may be directly related to the similarity of the potential idiom with a model idiom that exhibits the grammatical construction of a particular idiom of interest. In one embodiment the confidence level includes a value. Accordingly, the confidence level is assigned to the potential idiom.

Upon assignment of the confidence level value to the potential idiomatic phrase, an identification of an explanation of the potential idiom is performed (210). The explanation of the potential idiom is found by determining an association of the potential idiom with an explanation. In one embodiment, the potential idiom is associated with an explanation by utilizing the detected state of confusion, including determining an association between the detected confusion and the explanation. Identifying the explanation of the potential idiom includes parsing a conversation associated with the potential idiom and isolating component phrases in the conversation, comparing the isolated component phrases to one or more explanation tags in a corpus of learned knowledge, and detecting a match between a component phrase and an explanation tag. Accordingly, the state of confusion or the corpus of learned knowledge may be utilized to identify the explanation of the idiom in the communication.

A determination is made of whether the idiom has a first confidence level or a second confidence level (212). In one embodiment, the first confidence level includes a first range of confidence level values and the second confidence level includes a second range of confidence level values. If the potential idiom is determined to have an assigned first confidence level, or a value in the range associated with the first confidence level, at step (212), the potential idiom is identified as an idiom and the explanation of the idiom is associated with the idiom (214). In one embodiment, the extracted metadata associated with the origin of the idiom is associated with the idiom. The corpus is modified to include a reference to the explanation of the idiom (216). For example, in one embodiment, a conversational phrase dictionary is provided within the corpus of learned knowledge, and an entry is created in the dictionary with the idiom, the associated explanation, a primary association between the idiom and the associated explanation, and the associated metadata. Accordingly, an idiom assigned the first confidence level is associated with a corresponding explanation and stored in the corpus of learned knowledge.

If the idiom is determined to have an assigned second confidence level, or a value in the range associated with the second confidence level, at step (212), the potential idiom and the explanation of the potential idiom are conveyed to an entity including conveyance of the second confidence level (218). In one embodiment, the conveyance may request feedback from one or more entities represented in the communications. For example, upon ascertaining a possible explanation for the idiom, one or more of the entities that are members of the conversation may receive a secondary communication, with the secondary communication directed at relevance or accuracy of the conveyed explanation. In one embodiment, the entity manually reviews the potential idiom, the explanation of the potential idiom, and the second confidence level value. Accordingly, an idiom assigned the second confidence level is conveyed to an entity for an integrity check including a solicitation of a response.

The entity assigns a secondary association between the explanation and the potential idiom (220) and the corpus is selectively updated depending on the secondary association assigned by the entity (222). In one embodiment, the secondary association includes the entity issuing a command to either accept or discard the explanation. In one embodiment, an acceptance of the explanation includes identification of the potential idiom as an idiom, an association of the explanation with the idiom, and creation of an entry in the corpus of learned knowledge that includes the idiom, the explanation, the association, and the confidence level. Similarly, in one embodiment, the acceptance includes an association of the idiom with one or more aspects of the entity that communicated the phrase including extracted metadata. The entry creation at steps (216) and (222) may be automated or manual. Similarly, in one embodiment, the automation of the entry may be directly correlated with the assigned confidence level. For example, an explanation above a threshold confidence level may automatically be entered in the dictionary, wherein an explanation below the threshold may be entered with the entry being manually created. Accordingly, the knowledge database is updated with the idiom and the explanation of the idiomatic phrase.

Multiple electronic communications may be utilized to update the corpus of learned knowledge. For example, a state of confusion associated with one or more communications formulated in an electronic medium is detected, including but not limited to, a social media platform. In one embodiment, the electronic medium may be a direct text communication between two entities. As described above, the communication containing the idiom is identified utilizing the state of confusion. In one embodiment, a subsequent communication that functions as an explanation of the idiom is also extracted to provide context to the idiom. In one embodiment, one or more additional communications in the 'conversation' may also be extracted to enhance the accuracy of the explanation and/or translation of the idiom. Similarly, in one embodiment two or more idioms may be detected in a 'conversation' with each detected idiom requiring an explanation of the associated idiom. Accordingly, the idiom evaluation and confidence level assignment process described above may be extended to two or more idiomatic phrases present in a 'conversation.'

More specifically, upon detection of a second idiom in a communication, a second entity associated with the second communication, second idiom within the second communication, and second explanation of the second idiom, are identified. The second idiom and the second explanation are extracted from the second communication. A confidence level is assigned to the second idiom. In one embodiment, the confidence level assigned to the second idiom may be based on similarity between the second explanation of the second idiom and corresponding second metadata and the first explanation of the first idiom and corresponding first metadata. To further assist with determination of the idioms, a search is conducted for a match of the first and second metadata to determine correlations, if any, of the associated first and second profiles or aspects of the profiles of the entities participating in the communication. If a match is found, the matching entry in the corpus of learned knowledge is updated with the second explanation of the second idiom and the second metadata. If no match is found, a secondary application is activated and the secondary application sends a second alert that includes one or more of the following: the second idiom, second explanation of the idiom, second subject, second metadata, and the assigned confidence level of the second idiom. The alert may be responded to by assigning a secondary association to the second idiom and the corresponding second explanation which may be either a 'confirmed' status or a 'not confirmed' status. Based on the assigned second association of the second idiom the corpus of learned knowledge is selectively updated. Accordingly, the process shown and described in FIG. 2 may be expanded to evaluate and process multiple idioms within a conversation, including dynamic evaluation of each possible idiom, and simultaneously storing the idiom translations in a corpus of learned knowledge.

Figure 3:
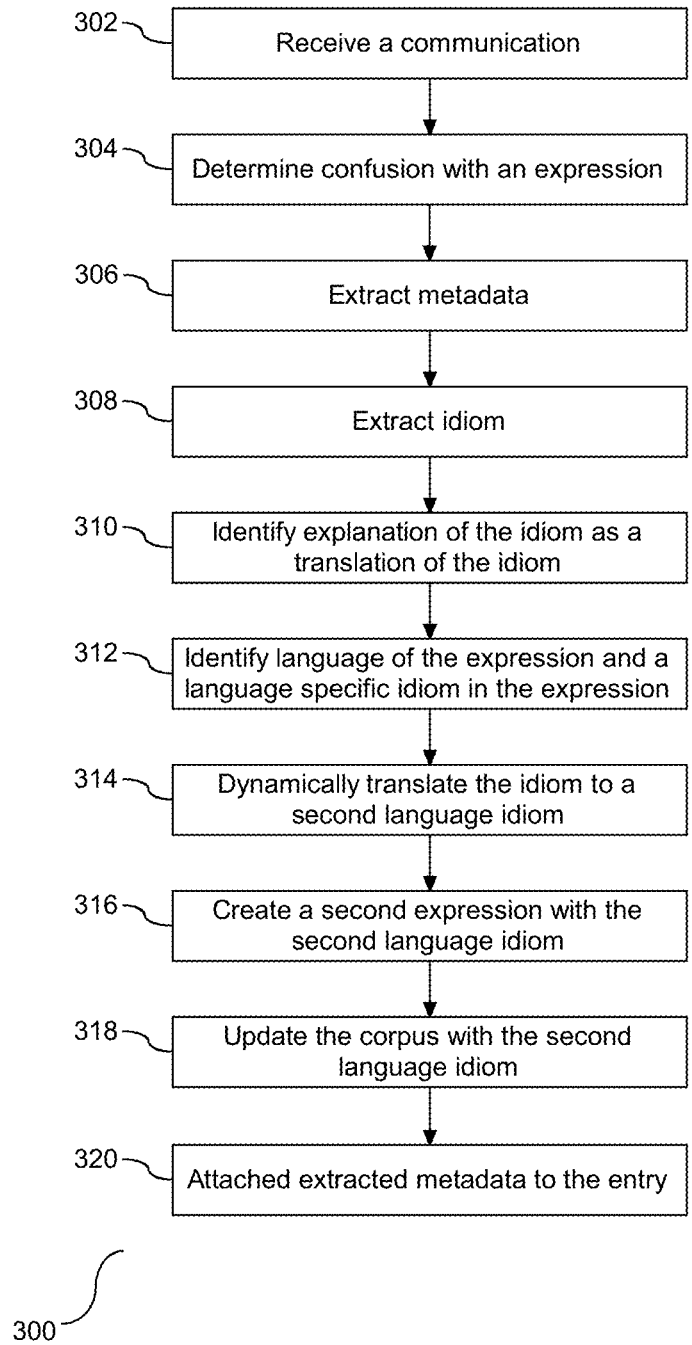
FIG. 3 depicts a flowchart illustrating a process for detection and translation of an idiom.

Referring to FIG. 3 a flowchart (300) illustrating a process to detect and translate the idiom is provided. As shown, a communication is received (302). The communication is examined to determine any confusion with an expression (304). In one embodiment, the determined confusion with an expression is exhibited with an indicator or flag that a potential idiom and a corresponding explanation are present in the expression. Confusion may be indicated by a question, surprise, emotion, emoticon, and/or based on a rule stored in a corpus of learned knowledge. Metadata associated with the expression causing confusion is extracted (306). The metadata may include, but is not limited to, aspects of the entity that generated the expression, such as age or age group, hometown, school, level of education, place of business/industry, race/ethnicity, current location or region, demography, dialect, accent, etc. Accordingly, a determination is made of an expression is causing confusion and the expression is subject to further analysis.

The idiom is extracted from the expression (308). The extraction includes parsing the expression and comparing the parsed expression with a corpus, to determine one or more components of the expression that comprise the idiom. An explanation of the extracted idiom is identified as a translation of the idiom (310). The explanation of the idiom may be identified by determining an association of the extracted idiom with an explanation and an association of the detected confusion with the explanation. The identification includes parsing one or more expressions within an electronic communication associated with the idiom and isolating component phrases in the electronic communication, comparing the isolated component phrases to one or more explanation tags in a corpus, and detecting a match between a component phrase and an explanation tag. Accordingly, the idiom is identified and the electronic communication is processed based on the idiom in order to identify an explanation of the idiom.

The language of the expression is identified and a language specific idiom is identified (312). The language is identified by one or more rules stored in a corpus. Languages may be, for example, but not limited to, Spanish, French, English, German, etc., In one embodiment, the dialect of the expression is determined. A dialect may be, for example, but not limited to, Bostonian, Southern, New Yorker, West Coast, Pittsburghese, Canarian, Llanito, Latin, Canadian, Cambodian, chat slang, etc. Utilizing the identified language and the extracted metadata, the idiom is dynamically translated to a second language (314). For example, the extracted idiom is compared with idioms in a corpus, such as a knowledge base, and an idiom entry that features a similar grammatical structure, metadata, language, and/or meaning as the extracted idiom is determined to be a matching entry. The translation includes examining the matching entry and using an explanation and/or translation associated with the matching entry to translate the extracted idiom from originating language to a second language. In one embodiment, the second language is a second dialect of the originating language. A second expression is created with the second language idiom (316). Accordingly, the language of the idiom is determined and utilized to identify matching entries in a corpus in order to translate the idiom into a second language.

In one embodiment, the corpus of learned knowledge is updated with the idiom second language translation, including creating an entry in the corpus including the second language idiom, the explanation of the idiom, the original language idiom, and/or any corresponding translations (318). The extracted metadata from the extracted idiom is attached to the created entry in the corpus (320). In one embodiment, the attached metadata is employed to ascertain trends regarding the use of the identified idiom. Accordingly the knowledge database is updated with the second language idiom including associated metadata.

Figure 4:
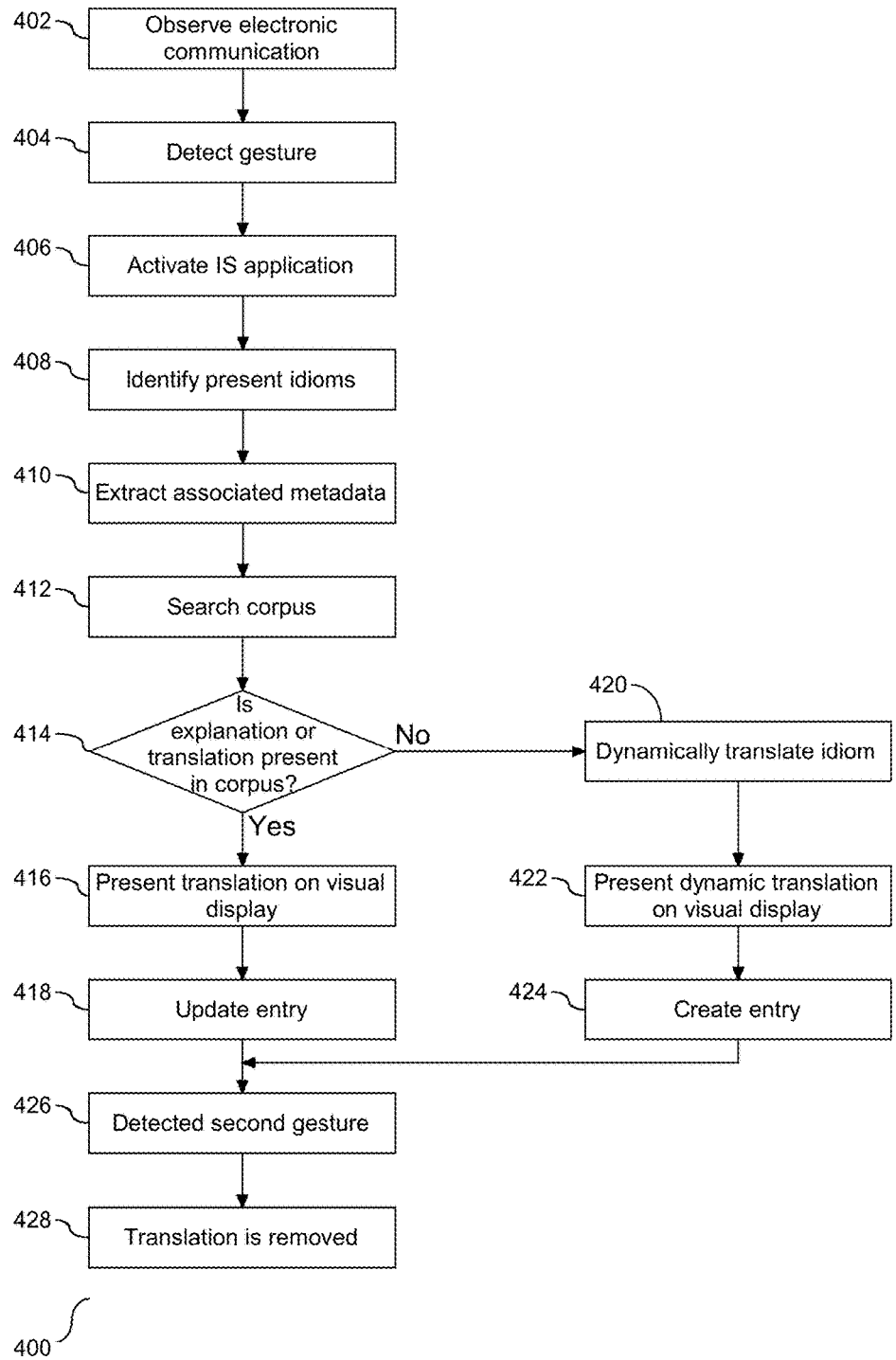
FIG. 4 depicts a flowchart illustrating identification and translation of idioms based on a gesture.

Referring to FIG. 4, a flow chart (400) is provided illustrating identification and translation of idioms based on a gesture. As shown, an electronic communication is observed in a primary window (402). A gesture is detected proximal a first expression in the electronic communication (404). In one embodiment, the detected gesture is movement of an indicia proximal the first expression, for example, a mouse, pointer, etc. In one embodiment, in the case of a display with a capacitive touch sensor, a gesture utilized to interface with the display is detected proximal the first expression in the electronic communication. It is similarly understood that indicia, sometimes in the form of a cursor, is utilized to identify a position with respect to the visual display and the active electronic communication. The detection of a gesture proximal to the electronic communication or proximal to an expression within the electronic communication activates an idiom search (IS) application (406). The application evaluates the electronic communication to search and identify any idioms that may be present (408). In one embodiment, the electronic communication is an active electronic communication present in an open window or viewing space on the visual display. Accordingly, detection of gestures proximal the electronic communication activates a search application to identify idioms present in the communication.

Metadata associated with the expression, idiom and/or an entity participating in the communication is extracted (410). Based on the idiom identification, or in one embodiment, a possibility of presence of an idiom in the communication, a corpus of learned knowledge is searched and consulted for a matching entry to the extracted idiom in order to facilitate ascertaining an explanation of the idiom, translation of the idiom, and/or connotation of the use of the idiom within the context of the electronic communication (412). In one embodiment, the metadata is utilized in the search and consultation of the corpus of learned knowledge. A determination is made if a translation of the idiom is present or absent in the corpus based on the search and consultation (414). If the idiom translation is determined to be present in the corpus at step (414), the translation is returned and presented on the visual display (416). The matching entry in the corpus is updated with the extracted idiom and/or extracted metadata (418). Accordingly, a translation of the idiom present in the corpus of learned knowledge is presented on the visual display.

It is understood that the presentation of the idiom translation should not interfere with the active communication(s). The communication(s) and the returned translation are presented in separate windows of the visual display, with the communication presented on a primary window and the returned idiom translation presented on a secondary window. In one embodiment, the presentation of the cursor proximal to the expression causes the IS application to create the secondary window, which in one embodiment is positioned proximal to the primary window so that the windows are not-overlapping to avoid interference.

Similarly, if a translation of the idiom is absent in the corpus as determined at step (414), the use of the idiom is analyzed as described above, and a dynamic translation of the idiom is performed with respect to the expression within the electronic communication (420). Following the dynamic translation, similar to step (416), the translation is presented on the visual display (422). The corpus is modified to create an entry for the extracted idiom, extracted metadata, translation and/or explanation of the idiom (424). For example, in one embodiment, a conversational phrase dictionary is provided within the corpus of learned knowledge, and an entry is created in the dictionary with the idiom, the associated explanation, the associated translation and the associated metadata. Accordingly, an idiom without a translation present in the corpus of learned knowledge is dynamically translated and the translation is presented on the visual display.

A second gesture in the electronic communication is detected (426). In one embodiment, the detected second gesture is movement of indicia away from the first expression. In one embodiment, in the case of a display with a capacitive touch sensor, a gesture utilized to interface with the display is removed or detected distal from the first expression in the electronic communication. It is similarly understood that indicia, sometimes in the form of a cursor, is utilized to identify a position with respect to the visual display and the active communication. Based upon the detection of a gesture at step (426), the translation is removed from the visual display (428). The removal of the translation includes minimizing or closing the secondary window to allow for unobstructed view of the remainder of the conversation or communication. Accordingly, the application evaluates a position on the cursor or equivalent indicia in relation to the electronic communication in the primary window, and selectively controls creation and removal of the secondary window, as well as population of data in the secondary window.

Figure 5:
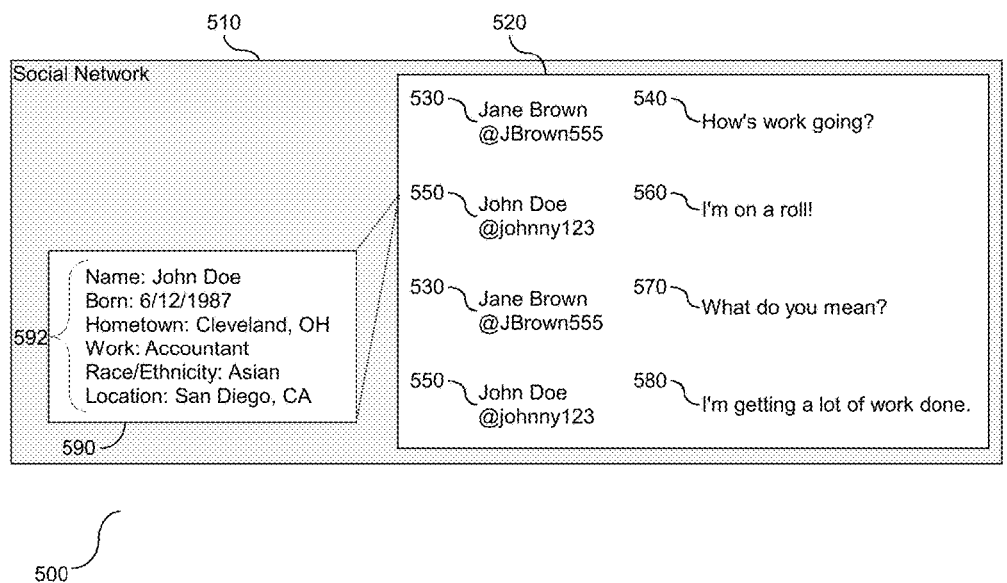
FIG. 5 depicts a block diagram illustrating an example of identification of an idiom in a set of communications transmitted in an electronic environment.

Referring to FIG. 5, a block diagram (500) is provided illustrating identification of an idiom in an example of a set of communications transmitted in an electronic environment. As shown, the series of electronic communications (520) are embedded in a social network portal (510), although this is not a limiting portal or environment. A plurality of expressions by two different entities is presented. The quantity of expressions and entities are for illustrative purposes and should not be considered limiting factors. The communication has the appearance of a bi-lateral series of communications, including a first communication (540) associated with a first entity (530), a second communication (560) associated with a second entity (550), with the second communication taking the form of a reply to the first communication (540). In addition, a third communication (570) is shown as a reply to the second communication (560), with the third communication (570) associated with the first entity (530), and a fourth communication (580) is shown as a reply to the third communication (570), with the fourth communication associated with the second entity (550). Although the example shown herein illustrates four communications (540), (560), (570), and (580), and two entities (530) and (550), the quantity of communications and entities should not be considered limiting. Accordingly, a series of electronic communications are shown between two entities.

In the series of electronic communications (520) shown herein, one or more relevant expressions indicating a state of confusion are identified. More specifically, in the example shown herein, the expression indicating confusion within the communications (520) is shown as expression in the form of a question "What do you mean?" within communication (570). Referring to FIG. 1, the indication of confusion with an expression is supported by the analyzer (152). Confusion is an indicator or flag that a possible idiom and a corresponding explanation may be in the series of electronic communications (520). In this example, the expression (570) may not be a clear indicator of the existence of an idiom and explanation in the communication(s) (520). However the expression (570) identifies the probability that a communication with a similar or the same expression has an idiom and corresponding explanation. Accordingly, a state of confusion is present in the series of communications (520).

As shown, an idiom is identified within communication (560) as the expression "I'm on a roll!" based on a relation of the idiom within communication (560) to the expression indicating confusion within communication (570) and in one embodiment, a search of a corpus of learned knowledge. In this example, the expression within communication (570) was communicated in response to the expression containing an idiom within communication (560) indicating the responsive communication (570) was responsive in relation to the idiom within communication (560). The explanation of the idiom is identified within communication (580) as the expression "I'm getting a lot of work done". Identifying the explanation includes parsing the series of electronic communications (520) and isolating component phrases in the conversation, comparing the isolated component phrases to one or more explanation tags in the corpus, and detecting a match between a component phrase and an explanation tag.

In this example, the explanation within communication (580) was communicated in response to the expression within communication (570) indicating the explanation within communication (580) is responsive to the state of confusion and is a meaning for the expression containing the idiom within communication (560). In one embodiment, the indication the explanation within communication (580) is a meaning for the idiom within communication (560) is related to communication of the idiom and the explanation by the same entity (e.g. second entity (550)). Accordingly, the idiom and the explanation of the idiom are identified.

The series of communications (540), (560), (570), and (580), shown herein may be present in any form of social network venue (510). The social network (510) may include written communications with written phrases, such as an instant messaging application, short messaging service, online blog, website, online community, news feed, or email. Similarly, the social network (510) may include oral communications with phrases in audible form such as Voice over IP, or online phone services such as FaceTime® or Skype®. Accordingly, an idiom and the corresponding explanation can be identified in a plurality of different communication mediums.

In one embodiment, the first entity (550) has an associated profile (590) in the social media network containing the venue of the communication(s) (520). The profile (590) is shown herein to include aspects (592) of the first entity (520). In one embodiment, the profile (590) and associated aspects (592) are gathered by extracting metadata associated with the first entity (550). For example, in one embodiment, the analyzer (152) extracts the metadata relating to aspects (592) within profile (590) of the first entity (550), such as age or age group, hometown (e.g. Cleveland), school, level of education, place of business/industry, race/ethnicity, current location or region (e.g. San Diego), demography, dialect, accent, etc. Extraction of the aspects (592) of the first entity (590) from the profile (590) supports gathering of metadata that may be employed by the analyzer (152) to facilitate creation of the corpus of learned knowledge in order to learn trends regarding the use of the identified idiom (560). After the explanation (580) of the idiom (560) is ascertained, the explanation (580), idiom (580), and aspect(s) (592) of the first entity (590) are extracted and stored in the corpus of learned knowledge as an entry including creating a primary association between the idiom (560) and the explanation (580). The entry supports any subsequent searches of one or more idioms. Accordingly, learned knowledge supports dynamic detection and analysis of aspects of the idiom.

Figure 6:
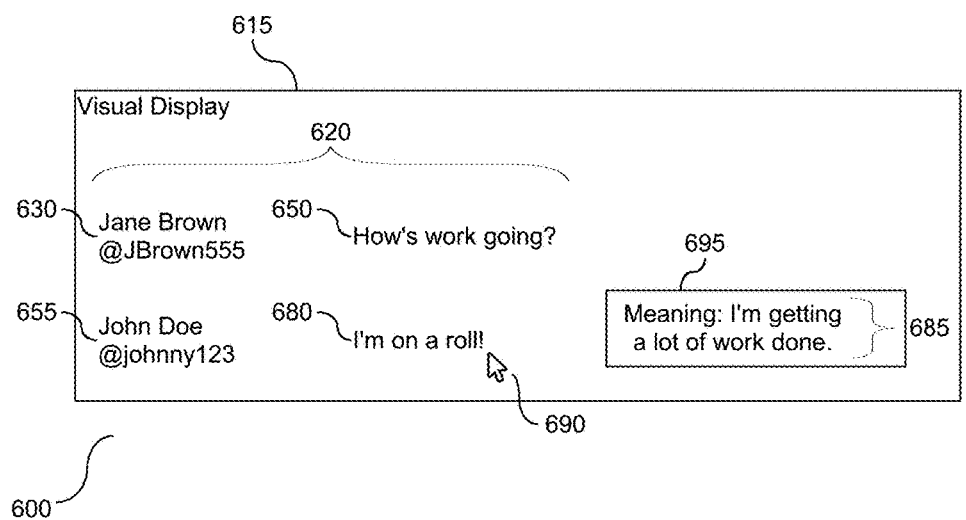
FIG. 6 depicts a block diagram illustrating an example of an automated translation of an idiom in response to a detected gesture.

Referring to FIG. 6, a block diagram (600) is provided illustrating an automated translation of an idiom in response to a detected gesture. As shown, a conversation (620) containing a first expression (680) by the third entity (655) and a second expression (650) communicated by a first entity (630) is presented on a visual display (615). A cursor (690), or an equivalent or similar form of indicia, is presented on the visual display (615) having a set of communications (620). Following detection of movement of the cursor (690) in the vicinity of a first expression (680), as presented on the visual display (615), an idiomatic search (IS) application (not shown) is activated. The IS application may be located in a device within a system, device, or apparatus operatively coupled to the visual display (615) or a system, device, or apparatus located externally, such as on a remote server or cloud computing server. The activated IS application identifies the first expression (680) as an idiom within one of the communications (620). The IS application searches and consults a corpus for a translation of the idiom (680). In one embodiment, the searching and consulting includes extracting metadata associated with the idiom within expression (680), the first entity (630), and/or third entity (655) and using the metadata to compare to entries in a corpus of learned knowledge, e.g. entry in a conversational phrase dictionary.

As shown herein, a translation (685) is determined or selected from a matching entry in the corpus. A secondary window (695) is shown herein populated with the translation (685) of the idiom within expression (680). The secondary window (695) may be in a separate area of the visual display (615), such as proximal to a tool bar, or may be proximal to the cursor or pointer (690). Upon detecting movement of the cursor or pointer (690) away from the idiom within expression (680), the secondary window (695) may close to allow for an unobstructed viewing of the remainder of the conversation or communication. Accordingly, the secondary window may be displayed to provide a translation of an idiom and the secondary window may be subsequently removed to restore an unobstructed view of the electronic communication.

Aspects of identification and translation of idioms and explanations of idioms shown in FIGS. 1-6, employ one or more functional tools. Aspects of the functional tools, e.g. analyzer, translator, and idiom search application, and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
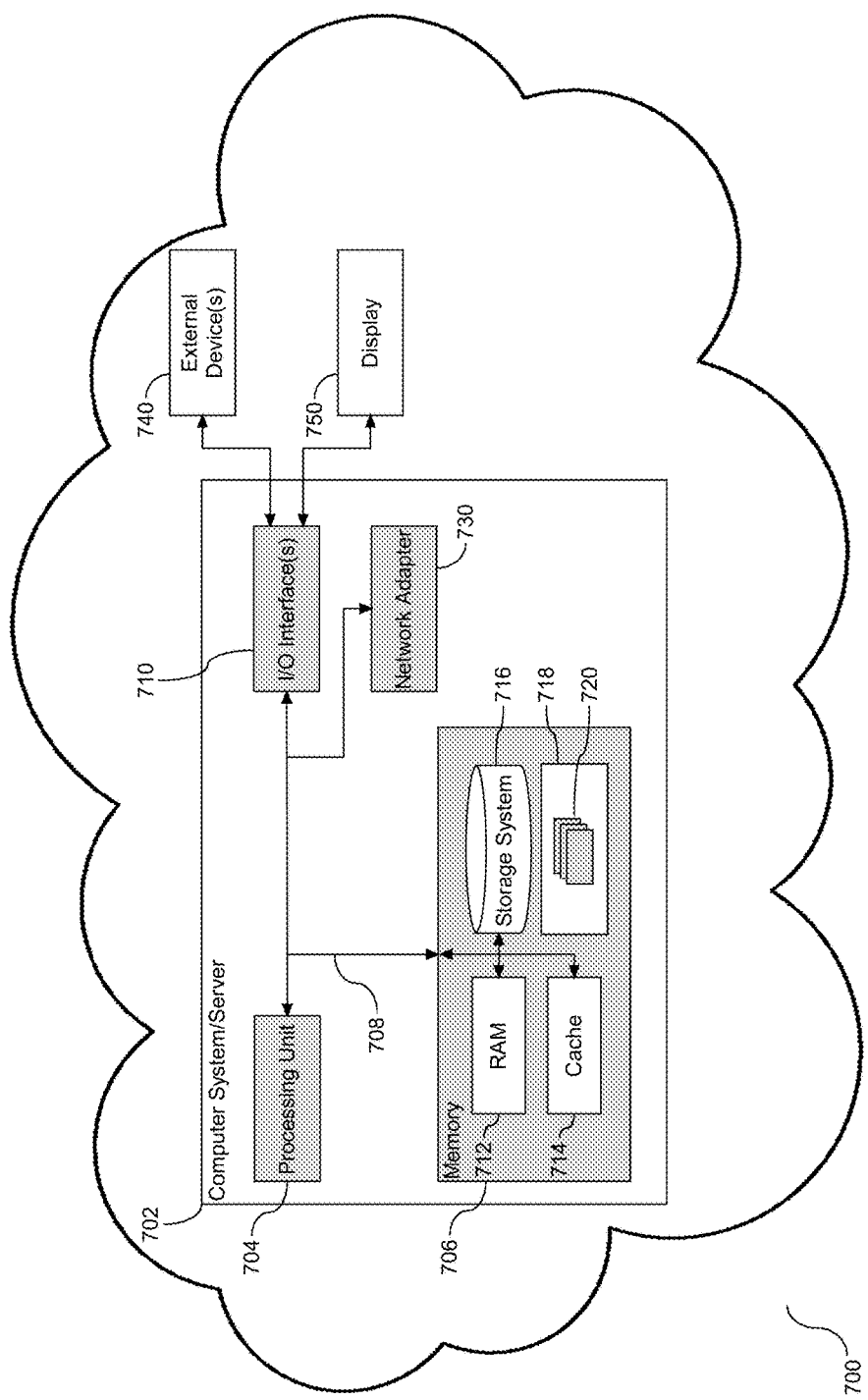
FIG. 7 is a block diagram illustrating an example of a computer system/server of a cloud based support system, to implement the process described above with respect to FIGS. 1-6.

As shown in FIG. 7, host (702) is shown in the form of a general-purpose computing device. The components of host (702) may include, but are not limited to, one or more processors or processing units (704), a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (712) and/or cache memory (714). By way of example only, storage system (716) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (718), having a set (at least one) of program modules (720), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (720) generally carry out the functions and/or methodologies of embodiments to store and analyze data. For example, the set of program modules (720) may include the modules configured as an analyzer, translator, and/or idiom search application in order to identify and translate idioms and explanations of idioms as described in FIGS. 1-6.

Host (702) may also communicate with one or more external devices (740), such as a keyboard, a pointing device, etc.; a display (750); one or more devices that enable a user to interact with host (702); and/or any devices (e.g., network card, modem, etc.) that enable host (702) to communicate with one or more other computing devices. Such communication can occur via Input/Output (I/O) interface(s) (710). Still yet, host (702) can communicate with one or more networks such as a local area network (LAN), a general wide area network (WAN), and/or a public network (e.g., the Internet) via network adapter (730). As depicted, network adapter (730) communicates with the other components of host (702) via bus (708). In one embodiment, a plurality of nodes of a distributed file system (not shown) is in communication with the host (702) via the I/O interface (710) or via the network adapter (730). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (712), cache (714), and storage system (716), such as a removable storage drive and a hard disk installed in a hard disk drive.

Computer programs (also called computer control logic) are stored in memory (706). Computer programs may also be received via a communication interface, such as network adapter (730). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
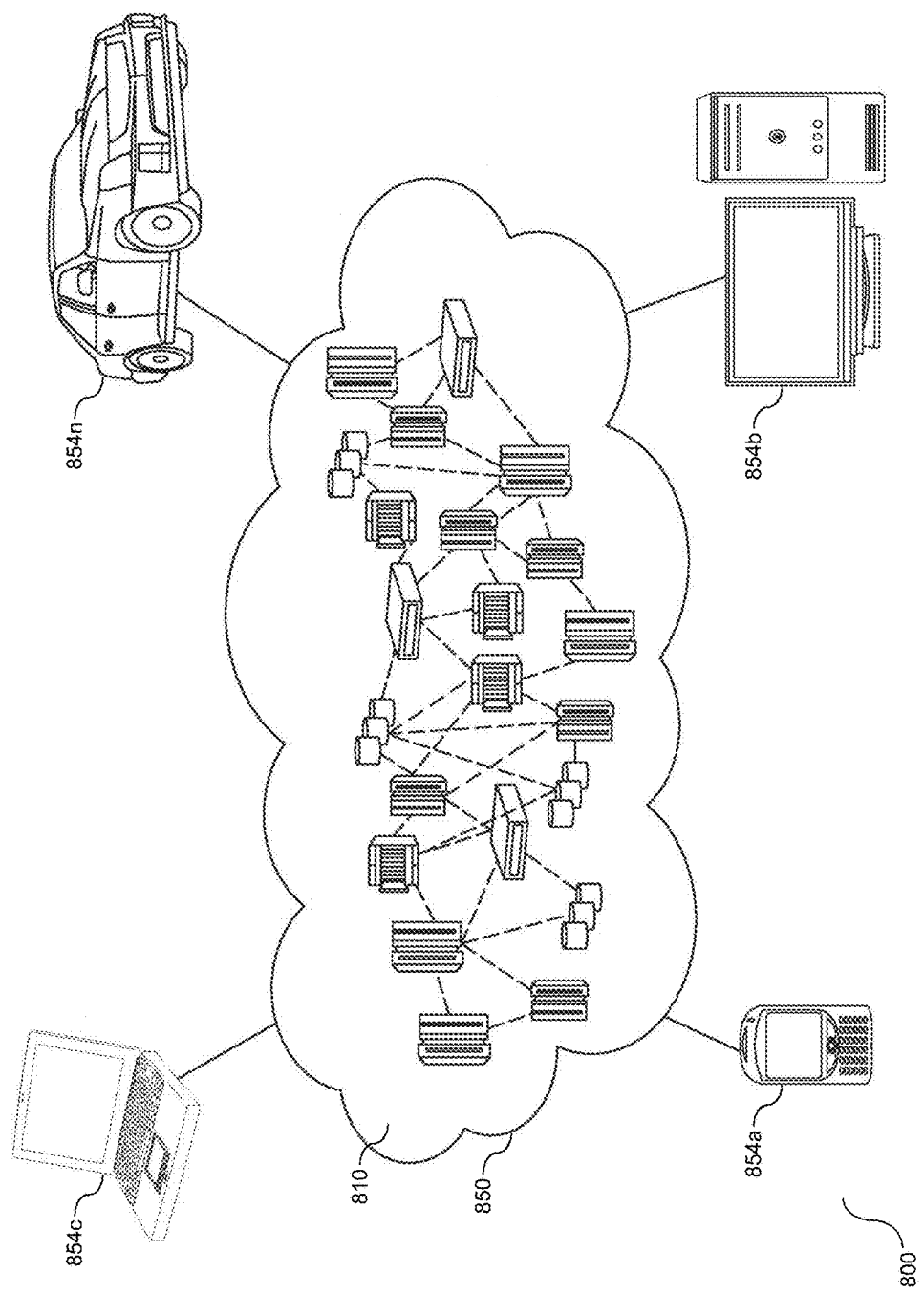
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
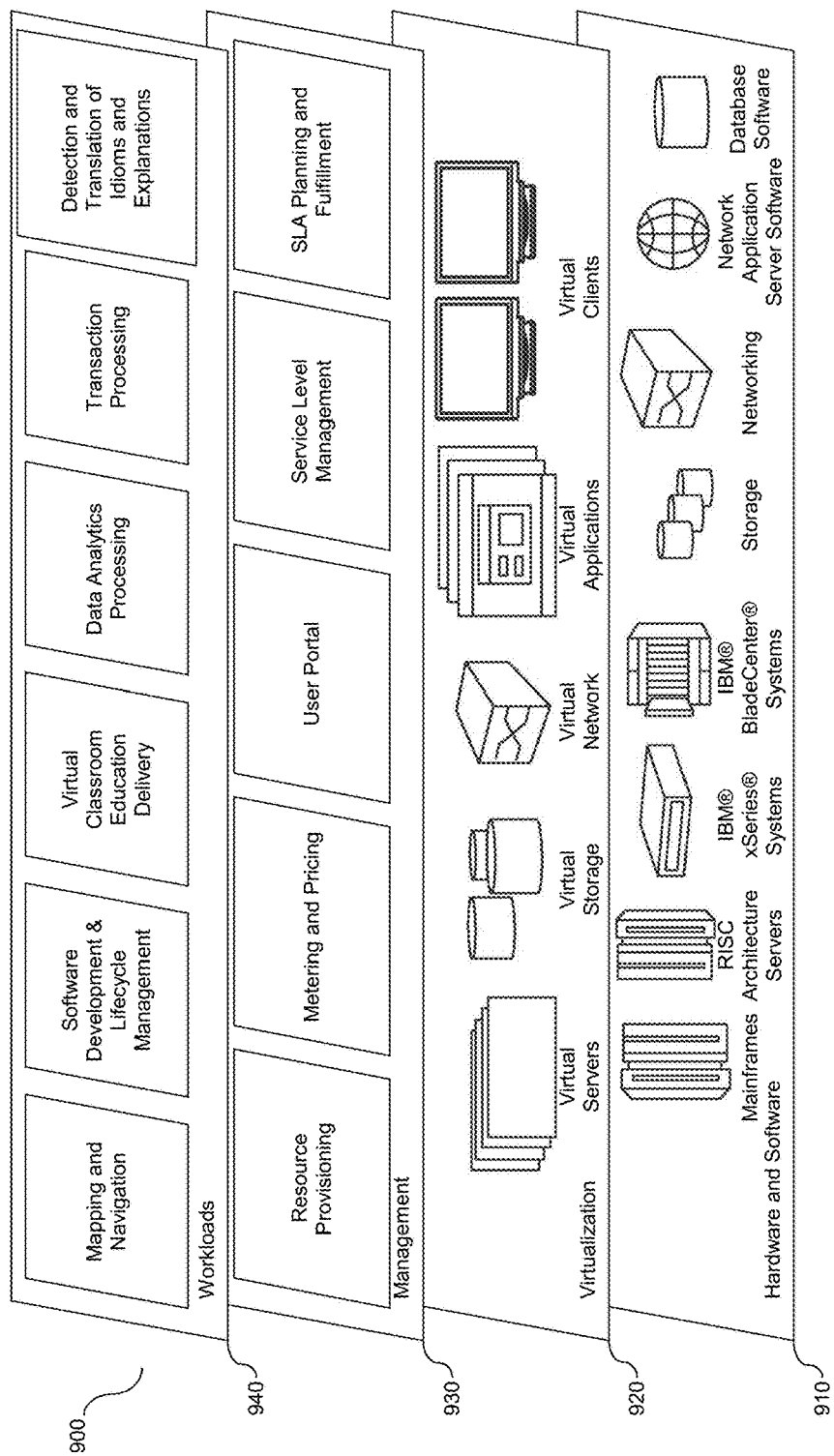
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and detection and translation of idioms and explanations.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of idiom identification and processing provides efficient translations and analysis of idioms.

It will be appreciated that, although specific embodiments have been described herein for purposes of illustration, various modifications may be made without departing from the spirit and scope of the embodiments. In particular, the natural language processing of one or more idioms in an electronic medium may be carried out by different computing platforms or across multiple devices. Furthermore, the data storage and/or corpus may be localized, remote, or spread across multiple systems. Accordingly, the scope of protection is limited only by the following claims and their equivalents.

What is claimed is:

1. A system comprising:
    a processing unit operatively coupled to memory;
    an artificial intelligence platform, in communication with the processing unit, the platform to dynamically evaluate an electronic communication, the platform including:
        an analyzer to:
            determine confusion with an expression in an electronic communication;
            identify an idiom within the expression;
            identify an explanation of the idiom based on a correspondence to the state of confusion; and
            extract the idiom and the explanation of the idiom from the electronic communication;
        a translator to:
            identify the language of the electronic communication including the language of the idiom;
            translate the idiom to a second language idiom; and
            create a second language expression utilizing the second language idiom; and
        the analyzer to update a corpus with the second language idiom, including transform the second language idiom into an updated entry in the corpus.

2. The system of claim 1, wherein the update further comprises the analyzer to transform the idiom and the explanation of the idiom into the updated entry in the corpus including create a primary association between the explanation and the idiom.

3. The system of claim 1, wherein the update further comprises the analyzer to transform an existing entry in the corpus into the updated entry in the corpus.

4. The system of claim 1, further comprising the analyzer to evaluate an origin of the idiom including, the analyzer to extract metadata associated with the origin and attach the metadata to the updated entry in the corpus.

5. The system of claim 1, wherein the extraction includes the analyzer to:
    parse the electronic communication and isolate two or more component phrases;
    compare a structure of the isolated component phrases to a component structure in the corpus, wherein the component structure is selected from the group consisting of: stored idioms and stored explanation tags;
    detect a match between at least one of the isolated component phrases and at least one component structure in the corpus; and
    wherein the extraction is performed utilizing the detected match.

6. The system of claim 1, wherein the explanation of the idiom is a translation of the idiom.

7. The system of claim 1, wherein translation of the idiom to a second language idiom comprises the translator to:
    parse the electronic communication and isolate two or more component phrases;
    compare a structure of the isolated component phrases to a structure of stored idioms in the corpus;
    detect a match between at least one of the isolated component phrases and a stored idiom in the corpus; and
    return the detected match as the second language idiom as related to the parsed electronic communication.

8. A computer program product for dynamically evaluating an electronic communication, the computer program product comprising a computer readable storage medium having program code embodied therewith, the program code executable by a processor to:
    determine confusion with an expression in an electronic communication;
    identify an idiom within the expression;
    identify an explanation of the idiom based on a correspondence to the state of confusion;
    extract the idiom and the explanation of the idiom from the electronic communication;
    identify the language of the electronic communication including the language of the idiom;
    translate the idiom to a second language idiom;
    create a second language expression utilizing the second language idiom; and
    update a corpus with the second language idiom, including transform the second language idiom into an updated entry in the corpus.

9. The computer program product of claim 8, wherein the update further comprises program code to transform the idiom and the explanation of the idiom into the updated entry in the corpus including create a primary association between the explanation and the idiom.

10. The computer program product of claim 8, wherein the update further comprises program code to transform an existing entry in the corpus into the updated entry in the corpus.

11. The computer program product of claim 8, further comprising program code to evaluate an origin of the idiom including, program code to extract metadata associated with the origin and attach the metadata to the updated entry in the corpus.

12. The computer program product of claim 8, wherein the extraction includes program code to:
    parse the electronic communication and isolate two or more component phrases;
    compare a structure of the isolated component phrases to a component structure in the corpus, wherein the component structure is selected from the group consisting of: stored idioms and stored explanation tags;
    detect a match between at least one of the isolated component phrases and at least one component structure in the corpus; and
    wherein the extraction is performed utilizing the detected match.

13. The computer program product of claim 8, wherein translation of the idiom to a second language idiom includes program code to:
    parse the electronic communication and isolate two or more component phrases;
    compare a structure of the isolated component phrases to a structure of stored idioms in the corpus;
    detect a match between at least one of the isolated component phrases and a stored idiom in the corpus; and
    return the detected match as the second language idiom as related to the parsed electronic communication.

14. A method employing an artificial intelligence platform for dynamically evaluating an electronic communication comprising:
    analyzing the electronic communication, including:
        determining confusion with an expression in the electronic communication;
        identifying an idiom within the expression;
        identifying an explanation of the idiom based on a correspondence to the state of confusion; and
        extracting the idiom and the explanation of the idiom from the electronic communication;

translating the electronic communication, including:
- identifying the language of the electronic communication including the language of the idiom;
- translating the idiom to a second language idiom; and
- creating a second language expression utilizing the second language idiom; and updating a corpus with the second language idiom, including transforming the second language idiom into an updated entry in the corpus.

15. The method of claim 14, wherein the updating includes transforming the idiom and the explanation of the idiom into the updated entry in the corpus including creating a primary association between the explanation and the idiom.

16. The method of claim 14, wherein the updating includes transforming an existing entry in the corpus into the updated entry in the corpus.

17. The method of claim 14, further comprising evaluating an origin of the idiom including, extracting metadata associated with the origin and attaching the metadata to the updated entry in the corpus.

18. The method of claim 14, wherein the extracting includes:
- parsing the electronic communication and isolating two or more component phrases;
- comparing a structure of the isolated component phrases to a component structure in the corpus, wherein the component structure is selected from the group consisting of: stored idioms and stored explanation tags;
- detecting a match between at least one of the isolated component phrases and at least one component structure in the corpus; and
- wherein the extraction is performed utilizing the detected match.

19. The method of claim 14, wherein the explanation of the idiom is a translation of the idiom.

20. The method of claim 14, wherein translating the idiom to a second language idiom includes:
- parsing the electronic communication and isolating two or more component phrases;
- comparing a structure of the isolated component phrases to a structure of stored idioms in the corpus;
- detecting a match between at least one of the isolated component phrases and a stored idiom in the corpus; and
- returning the detected match as the second language idiom as related to the parsed electronic communication.

* * * * *